FURNACES FOR MOLTEN METAL

Original Filed July 22, 1969 2 Sheets-Sheet 1

FURNACES FOR MOLTEN METAL

Original Filed July 22, 1969 2 Sheets-Sheet 2

United States Patent

Re. 28,382

Reissued Apr. 8, 1975

28,382

FURNACES FOR MOLTEN METAL

David Walter King, Solihull, England, assignor to Morganite Thermal Designs Limited, Norton, Worcester, England Original No. 3,635,457, dated Jan. 18, 1972, Ser. No. 843,582, July 22, 1969. Application for reissue Jan. 18, 1974, Ser. No. 434,629

Claims priority, application Great Britain, July 25, 1968, 35,500/68

Int. Cl. C21c *7/00*

U.S. Cl. 266—33 R 8 Claims

Matter enclosed in heavy brackets [ ] appears in the original patent but forms no part of this reissue specification; matter printed in italics indicates the additions made by reissue.

ABSTRACT OF THE DISCLOSURE

A furnace for molten metal comprises a refractory bath to hold metal surrounding a heater which consists of a cup-shaped refractory vessel which stands in the bath and receives a high-velocity stream of hot gas directed into the mouth of the vessel from a fuel burner.

DESCRIPTION

This invention relates to furnaces and provides a furnace suitable for melting metal and holding molten metal ready for use, such as in diecasting.

It is known to provide such a furnace consisting of a thermally insulated bath, to hold the molten metal, into which extends an immersion heater which may be an electrical heater or a conduit for flame from a fuel such as gas and air.

According to the present invention, a furnace comprises a refractory bath, to hold molten metal up to a given level, a heat-conductive refractory vessel supported in the bath in an upright position and spaced inwardly from the wall of the bath, so that molten metal can surround the vessel in the bath, said vessel having an upwardly directed mouth above the given metal level, and a fuel burner for producing a high-velocity stream of hot gas directed downwardly into the mouth of the vessel, the inner surface of the vessel forming a reversing baffle, for downward impingement and reverse flow upward of the steam of hot gas, and the vessel having an outlet for hot gas above the given metal level.

It is an important feature of the invention that a stream of hot gas, as distinct from flame, is used to heat the refractory vessel. The hottest part of a flame from a simple burner is at some point within the boundaries of the flame which therefore has a diminishing temperature gradient towards the outside. It is however possible to produce from a suitable burner, a high-velocity stream of hot gas more uniform in temperature than a flame and which can therefore, more efficiently than a flame, uniformly heat to a high temperature a body having a surface swept by the hot gas stream and particularly a vessel of which the inside surface forms a reversing baffle for the hot gas stream.

A gas-air burner suitable for producing a high velocity stream of hot gas is described in United Kingdom Pat. Specification No. 1,100,156 and such a burner is preferred for use with the present invention.

An open-mouthed refractory vessel suitable for use with the invention may be similar to, or actually consist of, a cup-shaped crucible such as is well known for holding molten metal in foundry work and which is made of a refractory material of high thermal conductivity, such as clay-graphite.

The invention is illustrated, by way of example, on the accompanying drawings, in which.

Figure 1:
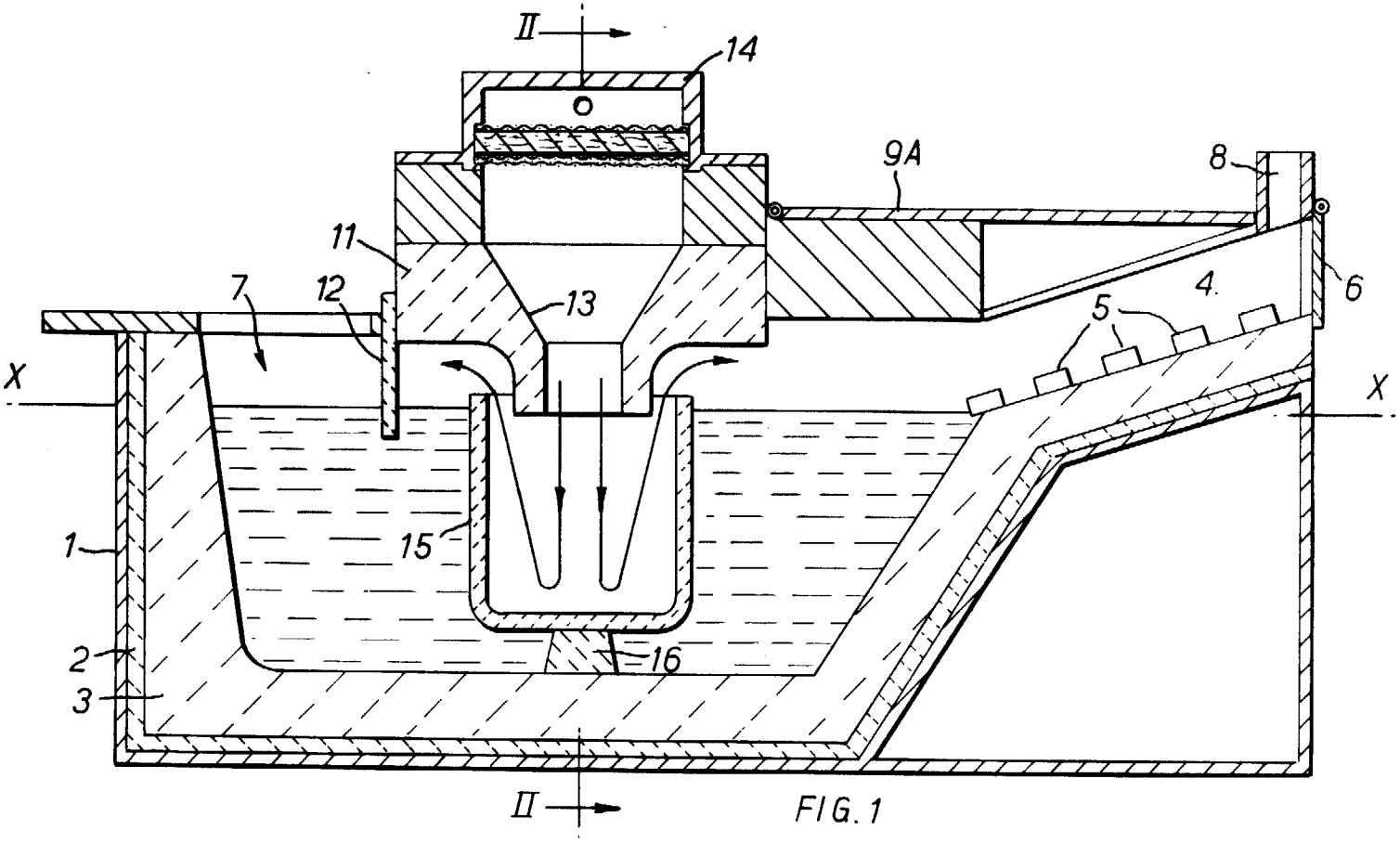
FIG. 1 is a longitudinal section through a furnace.
Figure 2:
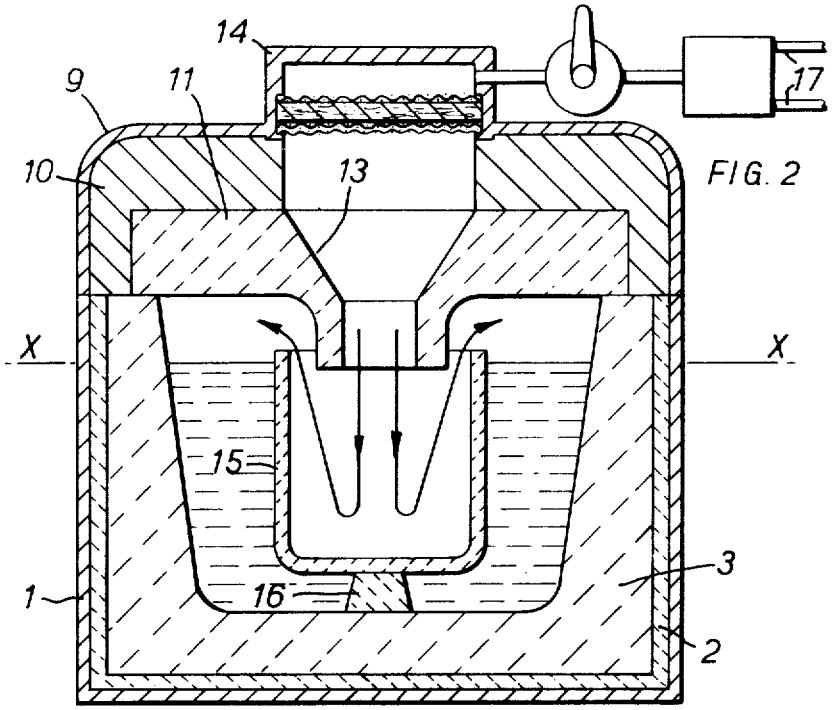
FIG. 2 is a cross section on the line II—II of FIG. 1.

The furnace illustrated by FIGS. 1 and 2 comprises a bath consisting of a casing 1, which may be of metal or brickwork, having an intermediate lining 2, of a refractory, thermally insulating material such as diatomaceous brick, and an inner lining 3, of a refractory material resistant to molten metal such as a cast refractory.

As shown by FIG. 1, the bath has a sloping end forming an inlet 4 through which are fed billets 5 of metal to be melted, a flap 6 being provided to close the inlet.

The top of the bath is closed, except for a ladling opening 7 and a flue 8, by a cover 9 having intermediate and inner linings 10 and 11 of materials similar to those of the linings 2 and 3. An inverted weir 12 depends into the bath from the cover lining 11 down to below a normal molten metal level X—X so as to close off the ladling opening 7 from the space above the metal level from which hot gases can exhaust through the flue 8. A part 9A of the cover is hinged to form an inspection door.

Above the center of the bath, the inner lining 11 of the cover embodies a downwardly directed nozzle 13 for a high-velocity stream of hot gas, from a high-pressure gas-air burner 14 mounted in the cover 9, to enter a clay-graphite, cup-shaped refractory vessel 15 mounted on a plinth 16 on the bottom of the bath.

The vessel 15 is of such size that it has a surrounding clearance from the wall of the bath, to provide space for molten metal, and the mouth of the vessel 15 opens above the metal level and with an annular clearance around the nozzle 13.

The burner 14 is fed, through pipes 17, with air and gas under pressure so as to produce a high-velocity stream of very hot gas which impinges centrally at the base of the inner surface of the vessel 15 and is reversed, by the baffle effect of such surface, to sweep upwardly over the surface and exhaust around the nozzle 13, over the surface of the metal in the bath and out through the flue 8.

The clay-graphite vessel 15, having a high thermal conductivity, becomes heated by the hot gas and transmits heat to the surrounding metal in the bath, the transfer of heat taking place very efficiently through conduction and convection from the center outwards.

Figure 3:
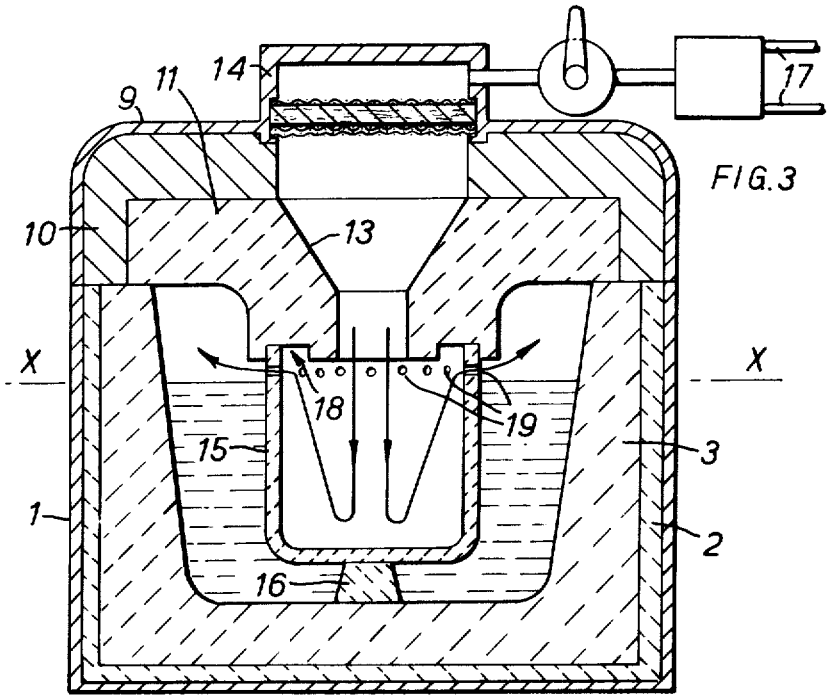
FIG. 3 is a cross section similar to FIG. 2 but showing a modification.

FIG. 3 shows a modified construction in which the rim of the vessel 15 enters a groove 18 around the nozzle 13, which closes the mouth of the vessel 15, and a ring of outlet ports 19 for the hot gas is provided through the rim of the vessel 15. This arrangement enables the maximum rate of exhaust of hot gas from the vessel 15, and thus the heat transfer time, to be selected to conform to a designed optimum.

*For convenience, the portion of the vessel 15 above the liquid level may be referred to as the upper part of the vessel and the portion of the vessel below the liquid level may be referred to as the lower part of the vessel.*

I claim:

1. A furance comprising a refractory bath, to hold molten metal up to a given level, a heat-conductive cup-shaped refractory vessel supported in the bath in an upright position and spaced inwardly from the wall of the bath, so that molten metal can surround the vessel in the bath, said vessel having an upwardly directed mouth above the given metal level and closed by a downwardly directed nozzle for passing a high-velocity stream of hot gas from a fuel burner downwardly into the mouth of the vessel, the inner surface of the vessel forming a reversing baffle for downward impingement and reverse flow upward of the stream of hot gas, and the vessel having an outlet for hot gas above the given metal level constituted by ports through the rim of the vessel.

2. A furnace according to claim 1, in which the furnace has a cover, the burner is mounted in the cover and the cover has a refractory lining, part of which forms the downwardly directed nozzle for the stream of hot gas, leading from the burner into the vessel.

3. A furnace according to claim 2, in which the cover is provided with a ladling opening and an inverted weir depending into the bath between the ladling opening and the vessel.

4. A furnace according to claim 1, including a narrow foot support extending between the bottom of the bath and the base of the vessel and spaced inwardly from the ball of the bath, such that molten metal can surround the vessel and the bath.

*5. A furnace comprising a refractory bath to hold molten metal up to a given level, a heat-conductive cup-shaped refractory vessel supported in the bath in an upright position and spaced inwardly from the wall of the bath, so that molten metal can surround the vessel in the bath, said vessel having an upper rim defining an upwardly directed mouth which opens above the given metal level, a nozzle structure engaging at least a portion of said rim of said vessel for passing a high velocity stream of hot gas from a fuel burner downwardly into the mouth of the vessel, the inner surface of the vessel forming a reversing baffle for downward impingement and reverse flow upward of the stream of hot gas, said vessel comprising a lower part and an upper part, the lower part being located below the said given level so as to be immersed in the said molten metal, said upper part being an upward extension of said lower part and comprising that part of the vessel above said given level, said upper part comprising at least first and second portions, the first portion comprising at least a section of the said rim, which section is in engagement with said nozzle structure, and said second portion including means defining at least a portion of an outlet means for removal of said hot gases from the vessel out over the surface of the molten metal, and a flue means in said furnace spaced from said outlet means for receiving said gas exhausting from said outlet means and passing over the surface of the molten metal before discharging through said flue means.*

*6. A furance as defined in claim 5 and in which the furnace has a cover, said cover being provided with a ladle opening and an inverted weir depending into the bath and separating said ladling opening from said outlet means.*

*7. A furnace as defined in claim 5 and including an inlet through which billets of metal to be melted are fed into said furnace, said inlet inclluding a slopping wall upon which said billets are placed and said flue means being disposed such that said gases from said outlet means pass over said billets before being exhausted through said flue means.*

*8. A furnace comprising a refractory bath to hold molten metal up to a given level, a heat-conductive cup-shaped refractory vessel supported in the bath in an upright position and spaced inwardly from the wall of the bath, so that molten metal can surround the vessel in the bath, said vessel having an upper rim defining an upwardly directed mouth which opens above the given metal level, said rim engaging and being substantially closed by a downwardly directed nozzle structure for passing a high velocity stream of hot gas from a fuel burner downwardly into the mouth of the vessel, the inner surface of the vessel forming a reversing baffle for downward impingement and reverse flow upward of the stream of hot gas, said vessel comprising a lower part and an upper part, the lower part being located below the said given level so as to be immersed in the said molten metal, said upper part being an upward extension of said lower part and comprising that part of the vessel above said given level, said upper part comprising at least first and second portions, the first portion comprising at least a section of the said rim, which section is in engagement with said nozzle structure, and said second portion including means defining at least a portion of an outlet means for removal of said hot gases from the vessel out over the surface of the molten metal, and a flue means in said furnace spaced from said outlet means whereby said gas exhausting from said outlet means passes over the surface of the molten metal before discharging through said flue means.*

References Cited

The following references, cited by the Examiner, are of record in the patented file of this patent or the original patent.

UNITED STATES PATENTS

| | | | |
|---|---|---|---|
| 1,080,113 | 12/1913 | Kugelgen et al. | 266—34 R |
| 2,152,446 | 3/1939 | Temple | 266—39 |
| 2,385,333 | 9/1945 | Clapp et al. | 266—360 R |
| 2,496,113 | 1/1950 | Wollner | 126—360 R |
| 3,211,546 | 10/1965 | Kozma | 266—33 R |
| 3,266,485 | 8/1966 | Girton | 126—360 R |
| 1,751,533 | 3/1930 | Taylor | 126—360 R |
| 2,299,122 | 10/1942 | Battin | 126—360 R |
| 2,587,078 | 2/1952 | Wollner | 126—360 R |
| 2,642,129 | 6/1953 | Breese | 126—360 R |
| 2,603,476 | 7/1952 | Whiston | 266—33 |

FOREIGN PATENTS

| | | | |
|---|---|---|---|
| 604,033 | 11/1945 | Great Britain | 266—33 R |
| 961,175 | 6/1964 | Great Britain | 266—33 R |
| 35,500 | 7/1968 | Great Britain. | |

GERALD A. DOST, Primary Examiner